(12) United States Patent
Wakazono et al.

(10) Patent No.: US 9,096,384 B2
(45) Date of Patent: Aug. 4, 2015

(54) TIRE TESTING MACHINE CONVEYOR

(71) Applicant: Kobe Steel, Ltd., Kobe-shi (JP)

(72) Inventors: Takehiko Wakazono, Takasago (JP); Munenori Soejima, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/218,018

(22) Filed: Mar. 18, 2014

(65) Prior Publication Data

US 2014/0332348 A1 Nov. 13, 2014

(30) Foreign Application Priority Data

May 8, 2013 (JP) .................................. 2013-098174

(51) Int. Cl.
*G01M 17/02* (2006.01)
*B65G 37/00* (2006.01)

(52) U.S. Cl.
CPC ............. *B65G 37/00* (2013.01); *G01M 17/021* (2013.01); *G01M 17/022* (2013.01)

(58) Field of Classification Search
CPC ........................... G01M 17/021; G01M 17/022
USPC ............................................................. 73/146
See application file for complete search history.

(56) References Cited

U.S. PATENT DOCUMENTS

| | | | | |
|---|---|---|---|---|
| 6,082,191 A * | 7/2000 | Neiferd et al. | ............... | 73/146 |
| 8,943,881 B2 * | 2/2015 | Stanoszek et al. | ............... | 73/146 |
| 8,950,250 B2 * | 2/2015 | Wakazono et al. | ............. | 73/146 |
| 2013/0233066 A1 * | 9/2013 | Wakazono et al. | ............. | 73/146 |
| 2013/0333615 A1 * | 12/2013 | Wakazono et al. | ............ | 118/500 |
| 2014/0250996 A1 * | 9/2014 | Wakazono et al. | ............. | 73/146 |
| 2014/0260583 A1 * | 9/2014 | Vernyi et al. | .................... | 73/146 |

FOREIGN PATENT DOCUMENTS

| | | |
|---|---|---|
| JP | 2007-279057 | 10/2007 |
| JP | 2012-220319 | 11/2012 |

* cited by examiner

*Primary Examiner* — Gene Crawford
*Assistant Examiner* — Thomas Randazzo
(74) *Attorney, Agent, or Firm* — Oblon, McClelland, Maier & Neustadt, L.L.P.

(57) ABSTRACT

A plurality of conveyors including a center conveyor are appropriately disposed without any gap or step and any interference between driving units. The center conveyor includes a pair of left and right belt driving pulleys that are provided at the front and rear sides in the conveying direction so as to stretch loop-shaped conveyor belts therebetween and are provided at both sides in the width direction, a pair of first left and right pulleys that is connected to each other through a connection shaft disposed on rotation axes of the belt driving pulleys at both outer sides in the width direction, a pair of left and right second pulleys that is provided below the first pulleys at both outer sides in the width direction so as to stretch loop-shaped pulley belts between the first and second pulleys and includes a common rotation axis, a driving shaft that is disposed on rotation axes of the second pulleys and is connected to the pair of second left and right pulleys, and a motor that is connected to an end of the driving shaft.

2 Claims, 11 Drawing Sheets

TIRE TESTING MACHINE CONVEYOR

BACKGROUND OF THE INVENTION

1. Field of the Invention

The present invention relates to a tire testing machine conveyor that sends a tire to a tire testing machine.

2. Description of the Related Art

When there is any non-uniform portion having a variation in elastic modulus or dimensional shape in the circumferential direction of a tire attached to an automobile or the like, the non-uniform portion causes a vibration during a high-speed rotation, and hence running performance is degraded. For this reason, the tire is subjected to a circumferential uniformity test by a tire testing machine after a vulcanizing process. The tire testing machine performs a test in a manner such that a bead portion of the inner periphery of the tire is interposed between rim members, the tire is attached to a rotating spindle, a predetermined internal pressure is applied to the tire, and the tire is rotationally driven while being pressed against a road surface replacement member such as a drum. In general, lubricant (lubricating liquid) is applied to the bead portion of the tire to be tested in order to smoothly interpose the tire between the rim members. As such a tire testing machine, there is known a tire testing machine in which a tire to be tested is sent by a tire testing machine conveyor to a center position (a rotation shaft) of a spindle (for example, see JP 2007-279057 A and JP 2012-220319 A).

Then, in the tire testing machine conveyor that sends the tire to be tested to the center position of the spindle, the plurality of conveyors are connected to each other, and the tire is sent to the center position of the spindle in a falling state by the plurality of conveyors. Furthermore, there is also known a tire testing machine in which the tire is attached to the lateral side of the spindle in a standing state.

Further, in the tire testing machine, there is a demand for smoothly and fast conveying the tire to the test station in order to shorten the time taken for the test. Therefore, in the tire testing machine conveyor disclosed in JP 2007-279057 A, a photoelectric sensor that detects a front end of the tire in the conveying direction is provided at a predetermined position of an entrance of the test station, and the front end of the tire in the conveying direction is positioned at the predetermined position. Accordingly, the tire is conveyed to the test station by a small-diameter tire so that the tire center is conveyed at the positioning position. Thus, the conveying distance to the test station is shortened, and the conveying time is shortened.

SUMMARY OF THE INVENTION

However, in the tire testing machine conveyor disclosed in JP 2007-279057 A, the plurality of conveyors are connected to each other. For this reason, when there is an unnecessary gap or step between the plurality of conveyors, a slippage occurs between the tire and the conveyor at the portion, and hence there is a concern that the tire may not be smoothly and fast conveyed.

For this reason, as illustrated in FIG. 1 of JP 2012-220319 A, two belt conveyors that are adjacent to each other and correspond to a part of the plurality of belt conveyors are disposed so that the other belt conveyor is inserted to the inside of one of two belt conveyors, and hence a gap is not formed between two belt conveyors as much as possible. However, driving units (pulleys and motors) for driving two belt conveyors interfere with each other, and hence a problem arises in that the belt conveyors may not be appropriately disposed.

Therefore, an object of the present invention is to provide a tire testing machine conveyor capable of smoothly and fast conveying a tire by a configuration in which a plurality of conveyors are connected to each other and the plurality of conveyors are appropriately disposed without any gap or step and any interference between driving units.

In order to solve the above-described problems, the present invention provides a tire testing machine conveyor that sends a tire to a center position of a spindle in a tire testing machine equipped with the spindle to which the tire to be tested is attached, the tire testing machine conveyor including: a center conveyor that includes a pair of loop-shaped conveyor belts; and at least one of an entrance conveyor that is provided at the upstream side of the center conveyor in the conveying direction so that the downstream end is located between the pair of loop-shaped conveyor belts, and an exit conveyor that is provided at the downstream side of the center conveyor in the conveying direction so that the upstream end is located between the pair of loop-shaped conveyor belts, wherein the center conveyor includes: a pair of sets of a belt driving pulley at the front side in the conveying direction and a belt driving pulley at the rear side in the conveying direction to stretch the loop-shaped conveyor belts therebetween; a pair of connection shafts provided on any one rotation shaft of the belt driving pulleys at the front side in the conveying direction and of the belt driving pulleys at the rear side in the conveying direction common to both the pair of the sets of a belt driving pulley at the front side and a belt driving pulley at the rear side so as to protrude both outer sides of the center conveyor in the width direction of the conveyor belt; a pair of first pulleys, each of the first pulleys being connected to each of the connection shafts; a pair of second pulleys, each of the second pulleys being provided below each of the first pulleys so that a loop-shaped pulley belt is stretched between the first and second pulleys, each of the pair of second pulleys including a common rotation axis; a driving shaft that is disposed on the rotation axis of the second pulleys and connects the pair of second pulleys to each other; and a driving unit that is connected to one end of the driving shaft.

With such a configuration, the driving unit (the pulley and the motor) is driven so as to rotate the driving shaft, the pair of second left and right pulleys connected to each other by the driving shaft is rotated so as to rotate the pair of first left and right pulleys that stretch the pulley belts between the pair of second left and right pulleys and the pair of first left and right pulleys, the pair of first left and right pulleys is rotated so as to rotate any one of the pair of front and rear belt driving pulleys connected to the pair of first left and right pulleys, and the conveyor belts stretched between the belt driving pulleys move, thereby stably driving the center conveyor. Then, since the driving unit is provided at the outer lower side of the center conveyor in the width direction, a space is formed between the pair of left and right belt driving pulleys of the center conveyor, and hence the downstream front end of the entrance conveyor or the upstream front end of the exit conveyor may be located in the space between the pair of left and right belt driving pulleys. For this reason, the center conveyor and the entrance conveyor or the exit conveyor may be appropriately disposed without any gap or step therebetween and any interference between the driving units. Further, when the downstream end of the entrance conveyor or the upstream end of the exit conveyor is disposed between the pair of conveyor belts of the center conveyor, the plurality of conveyors is disposed so as to overlap each other. In addition, when the entrance conveyor or the exit conveyor is driven so as to be synchronized with the center conveyor, the tire is smoothly delivered between the plurality of conveyors. Accordingly, the conveying distance during the delivery is correctly kept, and hence the tire may be smoothly and fast conveyed.

Further, in the tire testing machine conveyor according to the present invention, the gap between the pair of loop-shaped conveyor belts may be arbitrarily changeable, and the width of the entrance conveyor and the width of the exit conveyor may be formed so as to be smaller than a minimum value of the gap.

With such a configuration, the diameter of the rim is changed depending on the size of the tire. Accordingly, when the width of the center conveyor is changed in response to the rim diameter so that the center conveyor does not interfere with the rim, the center conveyor may smoothly attach and detach the conveyed tire to and from the spindle by the upward and downward movement of the center conveyor. Then, since the width of the entrance conveyor and the width of the exit conveyor are formed so as to be smaller than the minimum width between the center conveyor, even when the width of the center conveyor is the smallest, the entrance conveyor and the exit conveyor may be inserted therebetween, and hence the plurality of conveyors may be appropriately disposed.

The tire testing machine conveyor of the present invention may smoothly and fast convey the tire by a configuration in which the plurality of conveyors are connected to each other and the plurality of conveyors are appropriately disposed without any gap or step and any interference between the driving units.

BRIEF DESCRIPTION OF THE DRAWINGS

FIG. 4A is a top view, FIG. 4B is a cross-sectional view, and FIG. 4C is a longitudinal sectional view.

DESCRIPTION OF THE PREFERRED EMBODIMENTS

Figure 1:
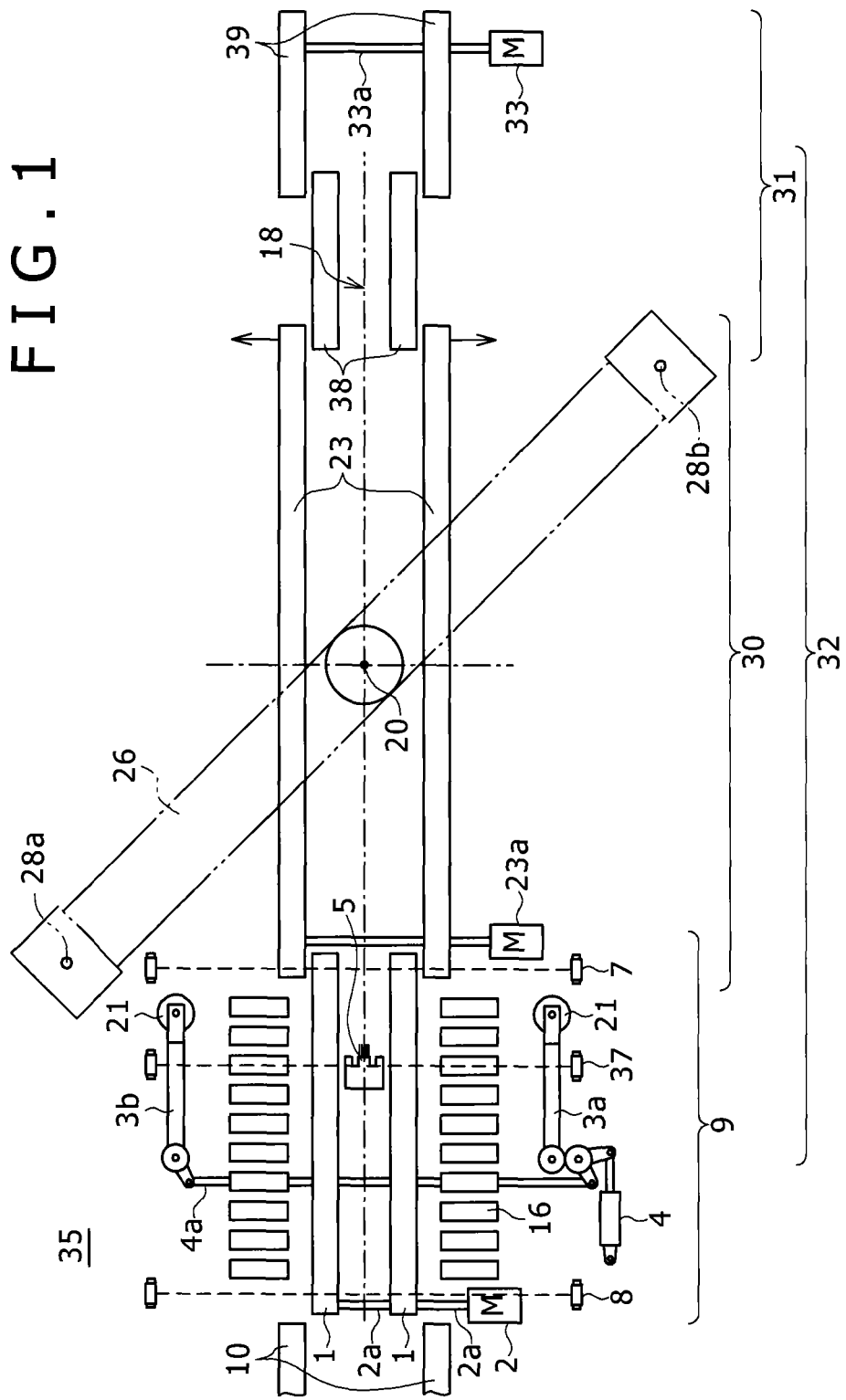
FIG. 1 is a top view illustrating a tire testing machine conveyor according to this embodiment.

Hereinafter, a specific example of an embodiment of a tire testing machine conveyor according to the present invention will be described by referring to the drawings.

Furthermore, the description below is merely an example, and does not show the application limit of the tire testing machine conveyor according to the present invention. That is, the tire testing machine conveyor according to the present invention is not limited to the embodiment below, and may be modified into various forms within the limit of claims.

Figure 3:
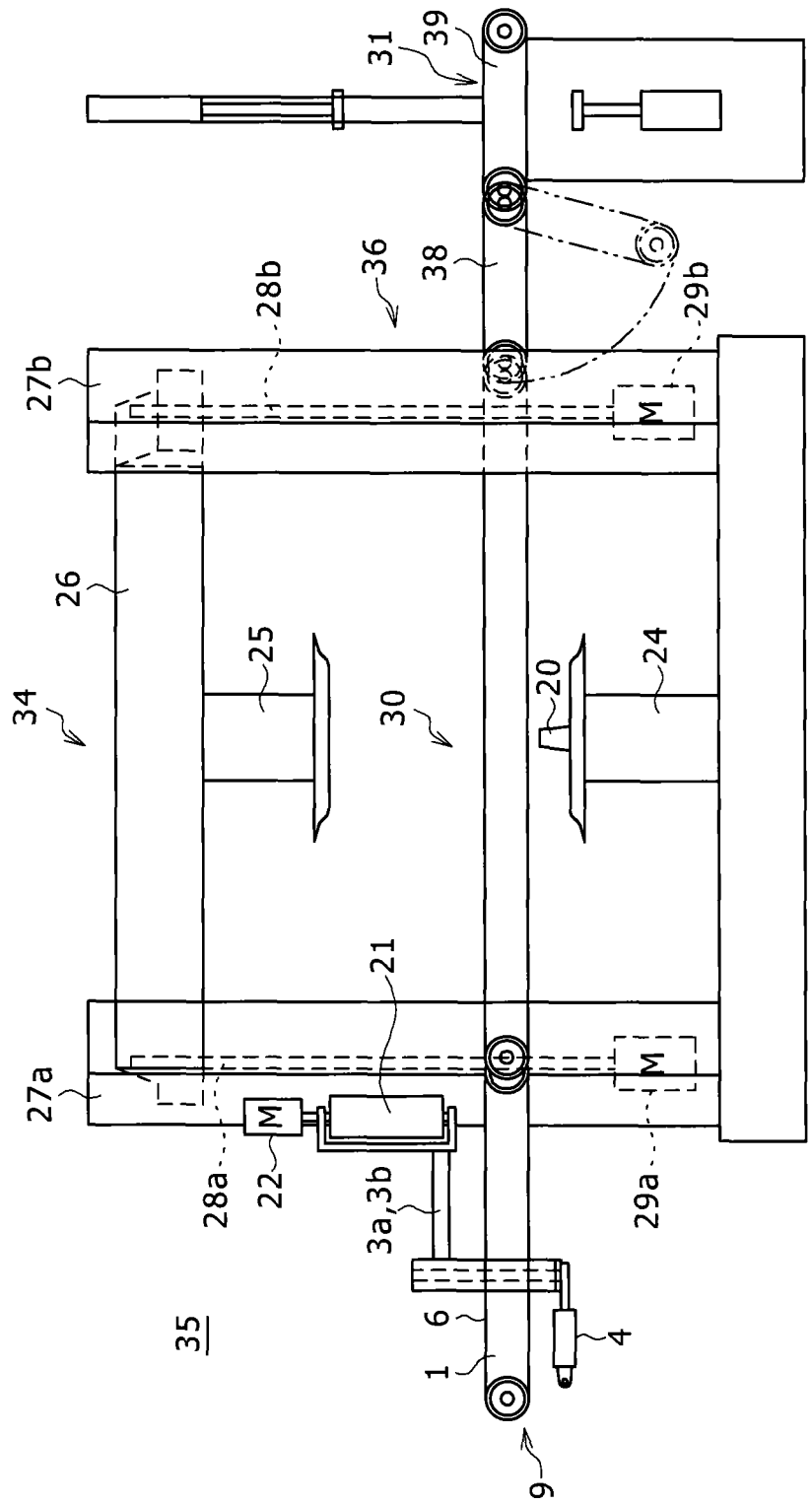
FIG. 3 illustrates the tire testing machine conveyor according to this embodiment and is a cross-sectional view taken along the line of Reference Numeral 18 of FIG. 1.

As illustrated in FIGS. 1 and 3, a tire testing machine conveyor 32 that is used in a tire testing machine 35 according to this embodiment includes an entrance conveyor 9 that conveys a tire 11 conveyed and input from a customer conveyor 10 while the tire 11 is placed on the entrance conveyor 9 in a falling state, a center conveyor 30 that is connected to the downstream side of the entrance conveyor 9 and extends into a test station (a test table) 34, and an exit conveyor 31 that is connected to the downstream side of the center conveyor 30 and conveys the tire 11 subjected to a test in the test station 34.

Figure 2:
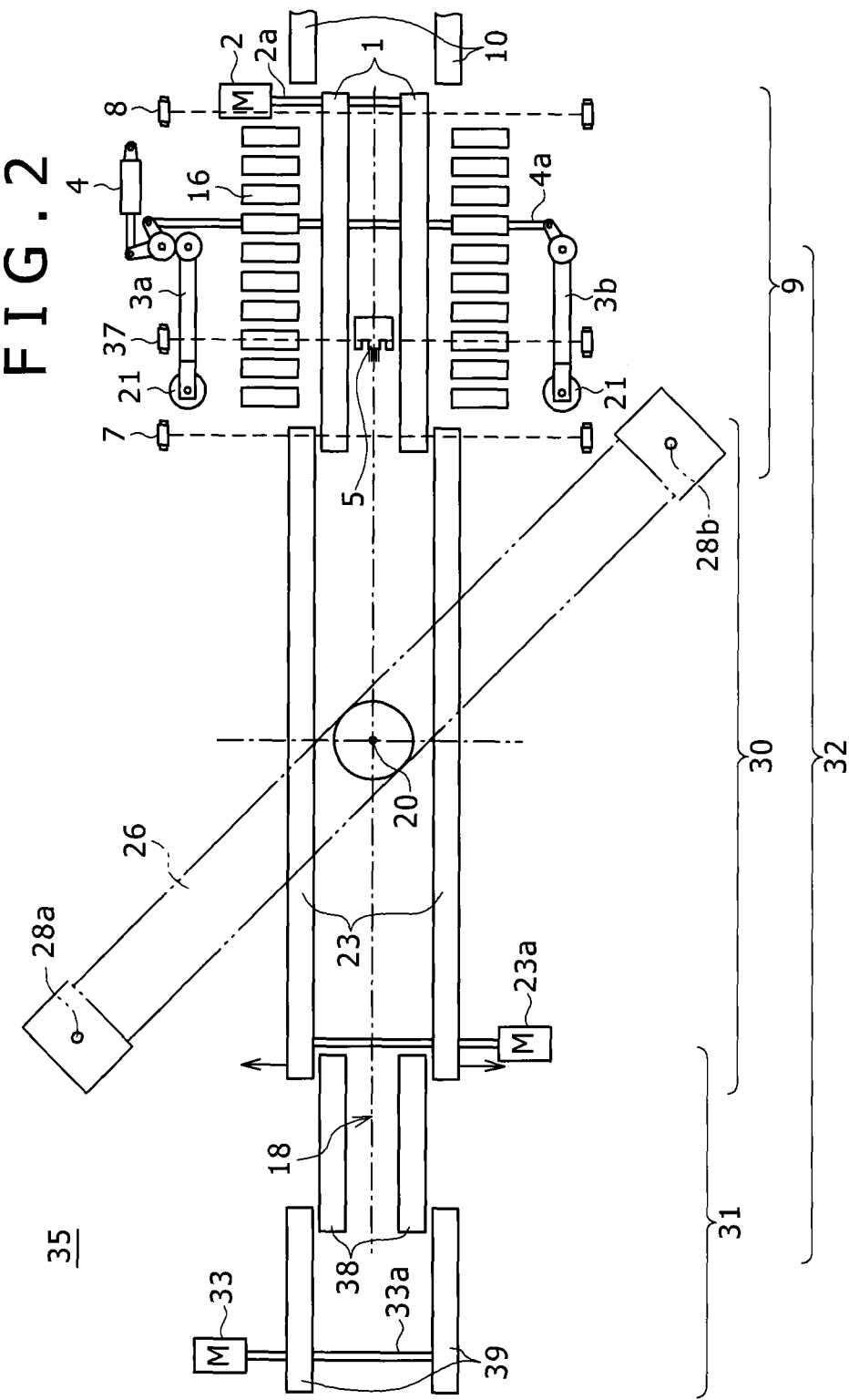
FIG. 2 is a top view illustrating a modified example of the tire testing machine conveyor according to this embodiment.

In the tire testing machine conveyor 32 according to this embodiment illustrated in FIG. 1, the conveying direction of the tire 11 corresponds to the direction from the left side to the right side in the drawing. In FIG. 1, the entrance conveyor 9 is disposed at the left side of the center conveyor 30, and the exit conveyor 31 is disposed at the right side of the center conveyor 30. Then, the center conveyor 30 is disposed inside the test station 34 constituting the tire testing machine 35. Furthermore, the conveying direction of the tire 11 is set as illustrated in FIG. 2 in a case where the conveying direction is reversed in FIG. 1. In a modified example of the tire testing machine conveyor 32 according to this embodiment illustrated in FIG. 2, the conveying direction of the tire 11 corresponds to the direction from the right side to the left side of the drawing. In FIG. 2, the entrance conveyor 9 is disposed at the right side of the center conveyor 30, and the exit conveyor 31 is disposed at the left side of the center conveyor 30. Then, as in the case of FIG. 1, the center conveyor 30 is disposed inside the test station 34 constituting the tire testing machine 35.

Regarding the flow of the conveyor in the tire testing machine conveyor 32 according to this embodiment, the downstream side is set as the front side of the conveying direction, and the upstream side is set as the rear side of the conveying direction. In FIG. 1, the front side of the conveying direction is set as the right side of the drawing, and the rear side of the conveying direction is set as the left side of the drawing. In FIG. 2, the front side of the conveying direction is set as the left side of the drawing, and the rear side of the conveying direction is set as the right side of the drawing.

Since each of the entrance conveyor 9, the center conveyor 30, and the exit conveyor 31 conveys the tire 11 on the upper surface thereof, the tire 11 is placed thereon in a falling state. Then, the upper surface of each of the entrance conveyor 9, the center conveyor 30, and the exit conveyor 31 forms the conveying surface of the tire 11. Then, the entrance conveyor 9, the center conveyor 30, and the exit conveyor 31 respectively include a pair of conveyor belts 1, a pair of conveyor belts 23, and a pair of conveyor belts 38 and 39. Further, each of the entrance conveyor 9, the center conveyor 30, and the exit conveyor 31 is formed so as to partially include the conveying surface of the tire 11 in the width direction. That is, the entrance conveyor 9 and the exit conveyor 31 are respectively disposed so that the entrance conveyor 9 (specifically, the pair of conveyor belts 1 of the entrance conveyor 9) and the exit conveyor 31 (specifically, the pair of conveyor belts 38 of the exit conveyor 31) are inserted between the pair of conveyor belts 23 constituting the center conveyor 30 at the upstream end and the downstream end of the center conveyor 30.

As described above, the entrance conveyor 9 and the exit conveyor 31 are formed so that the entrance conveyor 9 and the exit conveyor 31 are inserted between the pair of conveyor belts 23 of the center conveyor 30 at the upstream end and the downstream end of the center conveyor 30. For this reason, the tire 11 may be conveyed smoothly and fast without any gap or step in the plurality of conveyors such as the entrance conveyor 9, the center conveyor 30, and the exit conveyor 31.

Furthermore, regarding the width of the pair of conveyor belts 23 of the center conveyor 30, the width of the pair of conveyor belts 23 of the center conveyor 30 may be changed in response to the rim diameter changed according to the size of the tire 11 tested by the test station 34 so that the center conveyor 30 does not interfere with the rim. For example, the width of the pair of conveyor belts 23 of the center conveyor 30 may be narrowed to the minimum rim diameter of the tire 11 tested by the test station 34 or may be widened to the minimum rim diameter or more in the direction indicated by the arrows in FIGS. 1 and 2. Then, the width of the pair of conveyor belts 1 of the entrance conveyor 9 and the width of the pair of conveyor belts 38 of the exit conveyor 31 are formed so as to be narrower than the minimum width (that is, the width between the pair of conveyor belts 23 in response to the minimum rim diameter of the tire 11) of the pair of conveyor belts 23 of the center conveyor 30. Here, the width between the pair of conveyor belts 23 means the length of the space that is located between the pair of conveyor belts 23 and does not include the pair of conveyor belts 23 in the width direction. Further, the width of the pair of conveyor belts 1 and the width of the pair of conveyor belts 38 mean the length in the width direction that extends from one conveyor belt 1 and one conveyor belt 38 to the other conveyor belt 1 and the other conveyor belt 38 and includes the pair of conveyor belts 1 and the pair of conveyor belts 38. Accordingly, even when the width of the center conveyor 30 is narrowed to the smallest size for the minimum rim diameter of the tire 11 and is widened for the rim diameter larger than the tire 11, the configurations of the pair of conveyor belts 1 of the entrance conveyor 9 and the pair of conveyor belts 38 of the exit conveyor 31 inserted between the pair of conveyor belts 38 of the exit conveyor 31 and the pair of conveyor belts 23 of the center conveyor 30 are not influenced.

The entrance conveyor 9 includes the pair of conveyor belts 1 that is provided at both left and right sides in the width direction. The pulleys which are provided at the front and rear sides in the conveying direction and between which the pair of conveyor belts 1 provided at both left and right sides in the width direction is stretched are respectively connected to each other by one driving shape provided in the axial direction. Then, a belt conveyor servo motor 2 is connected to a driving shaft 2a connecting the pulleys (in FIG. 1, the rear pulleys in the conveying direction), and when the belt conveyor servo motor 2 is rotated, the pair of conveyor belts 1 is moved so that the entrance conveyor 9 is driven. The upstream side of the entrance conveyor 9 is connected with the customer conveyor 10 that supplies the tire 11 to be tested, and is provided with a photoelectric sensor 8 that detects a rear end 12 (see FIG. 5) of the tire 11 conveyed to the downstream side in the conveying direction. Further, the downstream side of the entrance conveyor 9 is provided with a photoelectric sensor 7 that detects a front end 13 (see FIG. 5) of the tire 11 conveyed to the center conveyor 30. Further, the slightly upstream side of the photoelectric sensor 7 is provided with a photoelectric sensor 37 that detects the front end 13 of the tire 11 conveyed to the center conveyor 30.

A lubricator 5 that is elevated by an air cylinder 14 (see FIG. 6) is provided between the pair of conveyor belts 1 of the entrance conveyor 9. As will be described later, the lubricator 5 includes a brush 5a that applies lubricant (lubricating liquid) to a bead portion 15 of the inner periphery of the tire 11.

A pair of arm members 3a and 3b of which the front ends facing the downstream side is provided at both sides of the entrance conveyor 9 in the width direction so as to be located at the center side of the entrance conveyor 9 in the conveying direction. As will be described later, each of the pair of arm members 3a and 3b is attached with a pressing roller 21 (a tire rotating unit) that presses the outer peripheral surface of the rotating tire 11 toward the center side, and the pair of arm members 3a and 3b rotate in a bilaterally symmetrical state inward and outward in the width direction by a link mechanism 4a and the air cylinder 4. As illustrated in FIG. 3, one or more of the pressing rollers 21 attached to the front ends of the pair of arm members 3a and 3b is rotationally driven by the motor 22.

A pair of roller portions 16 is provided at both outer sides of the pair of conveyor belts 1 constituting the entrance conveyor 9. Each roller portion 16 includes a plurality of placement rollers 16a attached to a frame (not illustrated). Each placement roller 16a includes a rotation shaft that is parallel to the width direction (the direction perpendicular to the conveying direction of the tire 11 using the pair of conveyor belts 1 constituting the entrance conveyor 9) of the entrance conveyor 9. Then, the roller portion 16 forms a placement surface that is parallel to the conveying surface of the entrance conveyor 9 and rotatably places the tire 11 within the horizontal plane in a falling state. Furthermore, as a predetermined position provided with the roller portion 16, the predetermined position may be a position between the pair of conveyor belts 1 constituting the entrance conveyor 9 or a position between the pair of conveyor belts 1 and both outer positions of the pair of conveyor belts 1. Each placement roller 16a of the roller portion 16 forms a placement surface that rotatably places the tire 11 within a horizontal plane and is formed by disposing a plurality of unit rollers (not illustrated), rotating about corresponding rotation shafts facing a direction perpendicular to the rotation shaft of the placement roller 16a as a main body, on the outer peripheral surface thereof.

Here, an elevation mechanism (not illustrated) is provided in the pair of conveyor belts 1 constituting the entrance conveyor 9 or the pair of roller portions 16. Then, the pair of conveyor belts 1 constituting the entrance conveyor 9 or the pair of roller portions 16 is adapted to be elevated relative to the placement surface of the pair of roller portions 16 or the conveying surface of the entrance conveyor 9. Furthermore, the elevation mechanism is configured as an air cylinder or the like.

Figure 4:
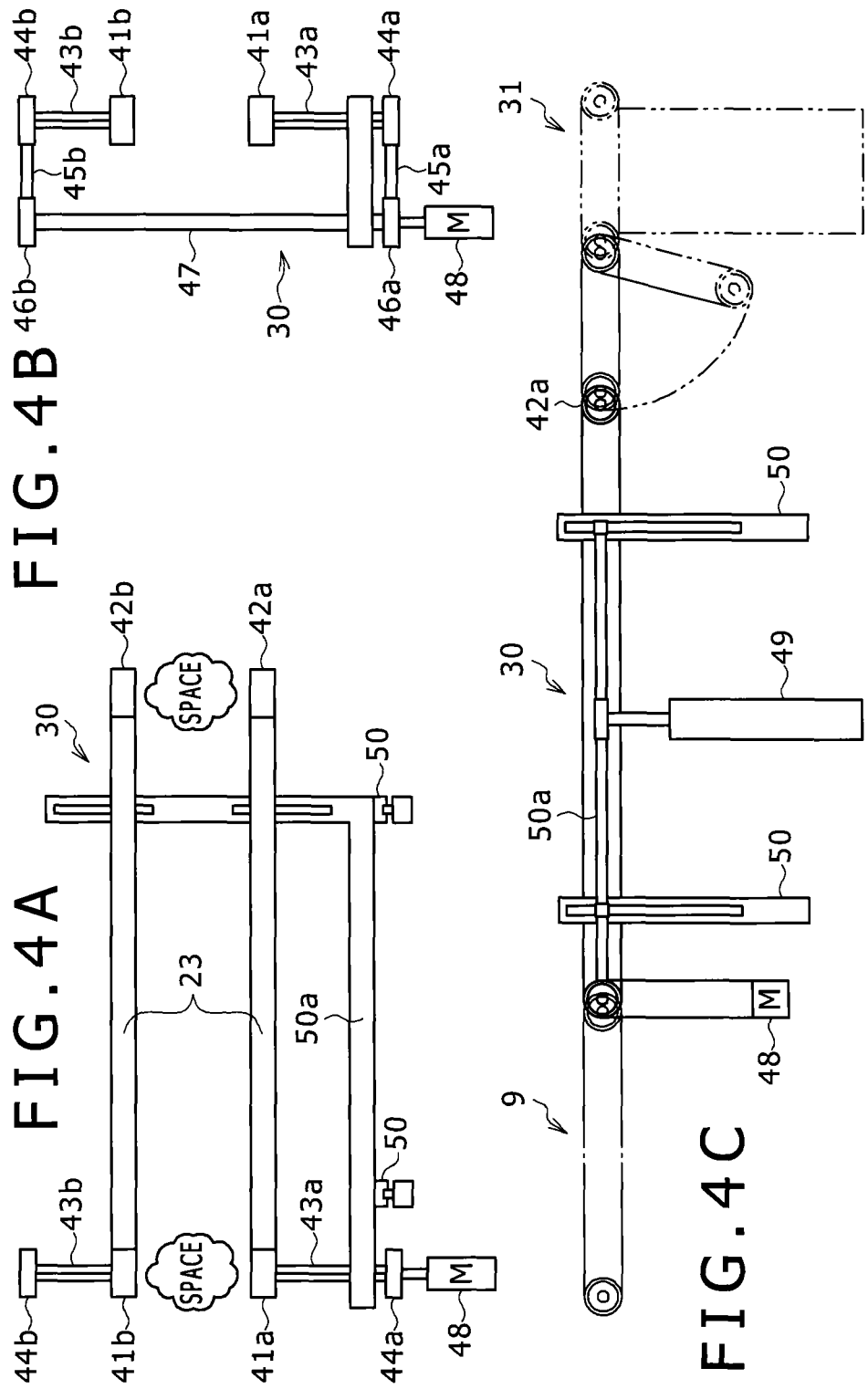
FIGS. 4A to 4C illustrate a center conveyor of the tire testing machine conveyor according to this embodiment, where

The center conveyor 30 sends the tire 11 received from the entrance conveyor 9 to a tire rotation center position (that is, a spindle core 20 of a lower spindle 24) of vertical spindles (the lower spindle 24 and an upper spindle 25) provided in the test station 34. A one-side shaft of the center conveyor 30 is connected to a belt conveyor servo motor 23a, and the center conveyor 30 may be driven by the rotation of the belt conveyor servo motor 23a. As illustrated in FIGS. 4A and 4B, the center conveyor 30 includes the pair of conveyor belts 23 that is provided at both left and right sides in the width direction. The pair of conveyor belts 23 is configured as a loop-shaped belt. Here, the first conveyor belt is stretched between the belt driving pulley 41a provided at the rear side (the upstream side) in the conveying direction and the belt driving pulley 42a provided at the front side (the downstream side) in the conveying direction, and the second conveyor belt is stretched between the belt driving pulley 41b provided at the rear side in the conveying direction and the belt driving pulley 42b provided at the front side in the conveying direction. Connection shafts 43a and 43b are disposed on the rotation axes of one-side belt driving pulleys (in this embodiment, the belt driving pulleys 41a and 41b provided at the rear side in the conveying direction) of the front and rear belt driving pulleys so as to be located at both outer sides of the pair of conveyor belts 23 in the width direction. In addition, a pair of first left and right pulleys 44a and 44b connected to one-side belt driving pulleys (in this embodiment, the belt driving pulleys 41a and 41b provided at the rear side in the conveying direction) of the front and rear belt driving pulleys is provided through the connection shafts 43a and 43b. At both outer sides of the pair of conveyor belts 23 in the width direction, a pair of second left and right pulleys 46a and 46b is provided below the pair of first left and right pulleys 44a and 44b. The pair of second left and right pulleys 46a and 46b includes a common rotation axis. Here, pulley belts 45a and 45b are configured as loop-shaped belts, the pulley belt 45a is stretched between the first pulley 44a and the second pulley 46a, and the pulley belt 45b is stretched between the first pulley 44b and the second pulley 46b. Further, the pair of second left and right pulleys 46a and 46b is connected by one driving shaft 47 disposed on the rotation axes of the pair of second left and right pulleys 46a and 46b. In addition, the driving shaft 47 is formed so that the end near any one (in this embodiment, the second pulley 46a) of the pair of second left and right pulleys 46a and 46b protrudes from the second pulley 46a, and a belt conveyor servo motor (a driving unit) 48 is connected to the end protruding from the second pulley 46a.

Then, when the belt conveyor servo motor 48 is rotated, the pair of second left and right pulleys 46a and 46b is rotated through the driving shaft 47. Then, when the pair of second left and right pulleys 46a and 46b is rotated, the pair of first left and right pulleys 44a and 44b is rotated through the pulley belts 45a and 45b. Then, when the pair of first left and right pulleys 44a and 44b is rotated, the belt driving pulleys 41a and 41b are rotated through the connection shafts 43a and 43b. Then, when the belt driving pulleys 41a and 41b are rotated, the pair of conveyor belts 23 is driven, and the belt driving pulleys 42a and 42b are rotated. With the above-described configuration, the center conveyor 30 may be driven.

Further, as illustrated in FIG. 4C, an air cylinder 49 is connected to the center conveyor 30. The air cylinder 49 is disposed so as to support the pair of conveyor belts 23 constituting the center conveyor 30 from the downside through an LM guide 50 in a direction from the lower portion of the LM guide 50 to be described later. Then, when the air cylinder 49 is driven (moves in a telescopic manner) in the vertical direction, the center conveyor 30 moves upward and downward. Further, in the center conveyor 30, two LM guides 50 are provided so as to be respectively located at the front and rear sides in the conveying direction with the air cylinder 49 interposed between the LM guides 50. As illustrated in FIG. 4A, each LM guide 50 is provided with a frame 50a that substantially has an L-shape. The frame 50a is disposed at the front side (at the side of the belt driving pulleys 42a and 42b) in the conveying direction so as to support both the pair of conveyor belts 23 from the downside and the frame 50a is disposed at the rear side (at the side of the belt driving pulleys 41a and 41b) in the conveying direction so as to support the connection shaft 43a from the downside. With such a configuration, the LM guide 50 serves as the vertical moving guide for the center conveyor 30 using the air cylinder 49. Then, the tire 11 on the center conveyor 30 is disposed on the rim of the lower spindle 24 of the test station 34 by the descending movement of the center conveyor 30 using the air cylinder 49, and the tire 11 is separated from the rim of the lower spindle 24 by the ascending movement of the center conveyor 30 using the air cylinder 49.

As illustrated in FIGS. 1 and 3, the exit conveyor 31 includes the pair of conveyor belts 38 and the pair of conveyor belts 39 provided at both left and right sides in the width direction. Each of the pair of conveyor belts 38 is configured as a drop conveyor, and may be disposed while being connected to the center conveyor 30 and being bent downward in parallel to the conveyor belt 39. Then, as illustrated in FIG. 4C, the frame 50a of the LM guide 50 of the center conveyor 30 is disposed so as to avoid the turning range by the bending of the pair of conveyor belts 38. Furthermore, in a case where the exit conveyor 31 is disposed at the position of the entrance conveyor 9, the driving shaft 47 is disposed so as to avoid the turning range by the bending of the pair of conveyor belts 38 of the exit conveyor 31.

Further, the pulleys which are provided at the front and rear sides in the conveying direction and between which the pair of conveyor belts 39 provided at both left and right sides in the width direction is stretched are connected to each other by one driving shaft provided in the axial direction. Then, a belt conveyor servo motor 33 is connected to a driving shaft 33a that connects the pulleys (in FIG. 1, the front pulleys in the conveying direction). Then, the pair of conveyor belts 38 and the pair of conveyor belts 39 are driven in a synchronized manner and are operated as a continuous conveyor in a manner such that the pulleys which is located at the front side in the conveying direction and around which the conveyor belts 38 are wound are connected to the pulleys which are located at the rear side in the conveying direction and on which the conveyor belts 39 are wound. Accordingly, when the belt conveyor servo motor 33 is rotated, the pair of conveyor belts 38 and the pair of conveyor belts 39 are operated in a synchronized manner, so that the exit conveyor 31 is driven.

As illustrated in FIG. 3, the tire testing machine 35 includes the test station 34 with the lower spindle 24 and the upper spindle 25. Further, the test station 34 is equipped with a chucking mechanism 36 that includes a slide beam 26, guide frames 27a and 27b, ball screws 28a and 28b, and motors 29a and 29b and is used to chuck the tire 11 in a manner such that the lower spindle 24 and the upper spindle 25 are driven so that the tire 11 to be tested is interposed between the lower spindle 24 and the upper spindle 25. That is, the chucking mechanism 36 is used to perform a chucking operation by driving the lower spindle 24 and the upper spindle 25. The upper spindle 25 is attached to the slide beam 26. The slide beam 26 is stretched between two guide frames 27a and 27b, and the ball screws 28a and 28b are attached to both sides thereof. The motors 29a and 29b are attached to one-side portions of the ball screws 28a and 28b, and drive the ball screws 28a and 28b in a synchronized manner so as to move the slide beam 26 upward and downward. Further, the lower spindle 24 includes the spindle core 20. Then, the tire 11 of which a tire shaft center 17 (see FIG. 9) matches the spindle core 20 is interposed between the lower spindle 24 and the upper spindle 25 in a manner such that the ball screws 28a and 28b are driven so as to move the slide beam 26 upward and downward, thereby completely conveying the tire 11 to the test station 34.

Hereinafter, a procedure in which the tire 11 conveyed from the customer conveyor 10 is conveyed from the entrance conveyor 9 to the center conveyor 30 inside the test station 34 and the tire 11 subjected to the test in the test station 34 is delivered to the exit conveyor 31 in the tire testing machine conveyor 32 according to this embodiment will be described by referring to FIGS. 5 to 11.

Figure 5:
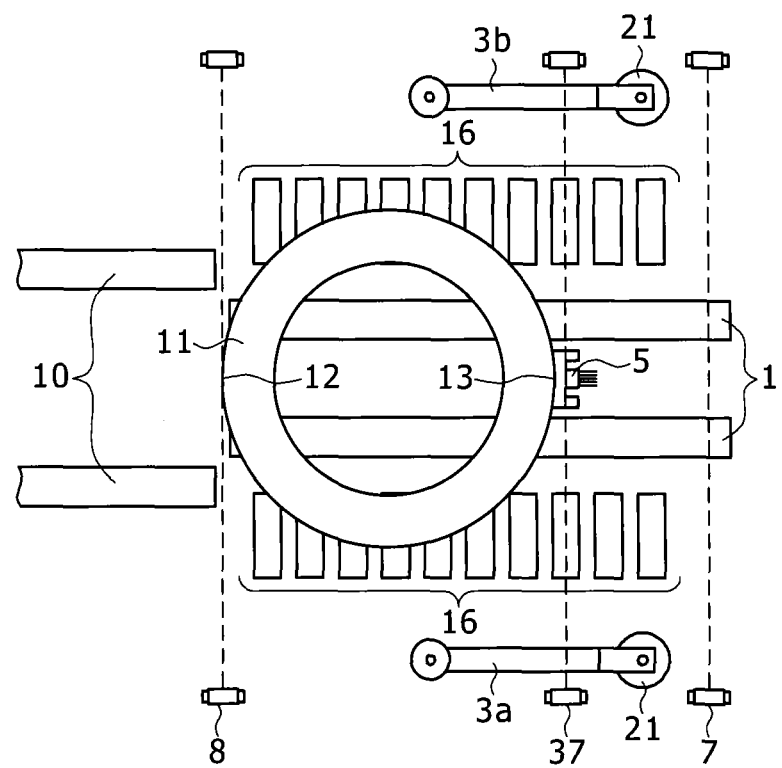
FIG. 5 is a top view illustrating a state where a tire is conveyed by the tire testing machine conveyor according to this embodiment.
Figure 6:
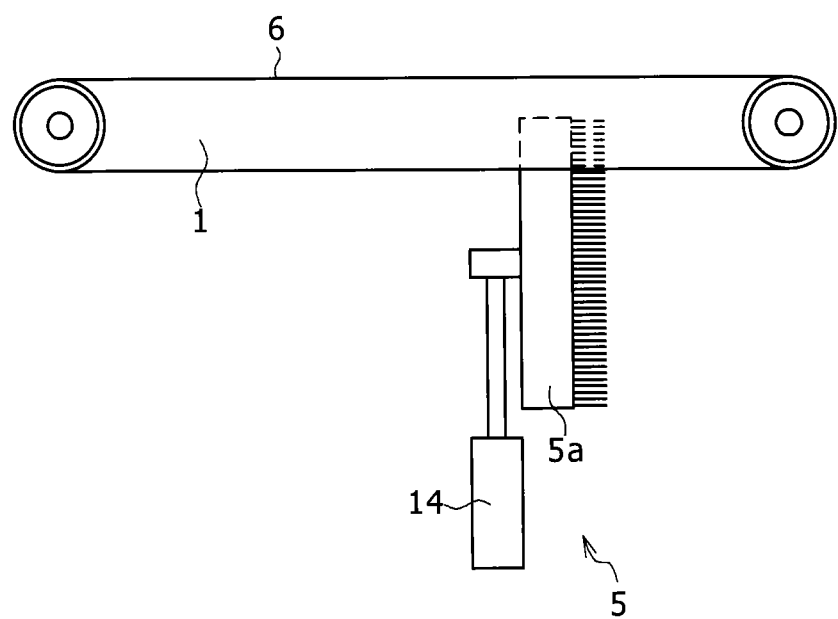
FIG. 6 is a top view illustrating an arrangement relation between the tire testing machine conveyor and a lubricator in the state of FIG. 5 in which the tire is conveyed by the tire testing machine conveyor according to this embodiment.

When the tire 11 is input from the customer conveyor 10 to the entrance conveyor 9, the lubricator 5 descends in relation to the conveying surface 6 of the entrance conveyor 9 as illustrated in FIG. 6. Furthermore, the descending movement of the lubricator 5 is performed by the air cylinder 14. Further, as indicated by the solid line of FIG. 8, the placement surface of the roller portion 16 is located below the conveying surface 6 of the entrance conveyor 9. Furthermore, the elevating movement of the placement surface of the roller portion 16 is performed by the elevation mechanism (not illustrated). Further, as illustrated in FIG. 5, the pair of arm members 3a and 3b is rotated outward in the width direction by the air cylinder 4 so as to be opened, and hence a space for conveying the tire 11 is ensured on the conveying surface 6 of the entrance conveyor 9.

Then, as illustrated in FIG. 5, the belt conveyor servo motor 2 is rotated so as to drive the entrance conveyor 9, and the tire 11 input from the customer conveyor 10 to the entrance conveyor 9 is conveyed on the entrance conveyor 9 in the conveying direction at a comparatively constant low conveying speed V. Then, the end (the rear end of the tire outer diameter) 12 away from the test station 34 in the outer diameter of the tire 11 is detected by the photoelectric sensor 8 at the upstream side of the entrance conveyor 9. Then, the time T1(s) at which the rear end 12 of the tire outer diameter is detected by the photoelectric sensor 8 is stored.

Figure 7:
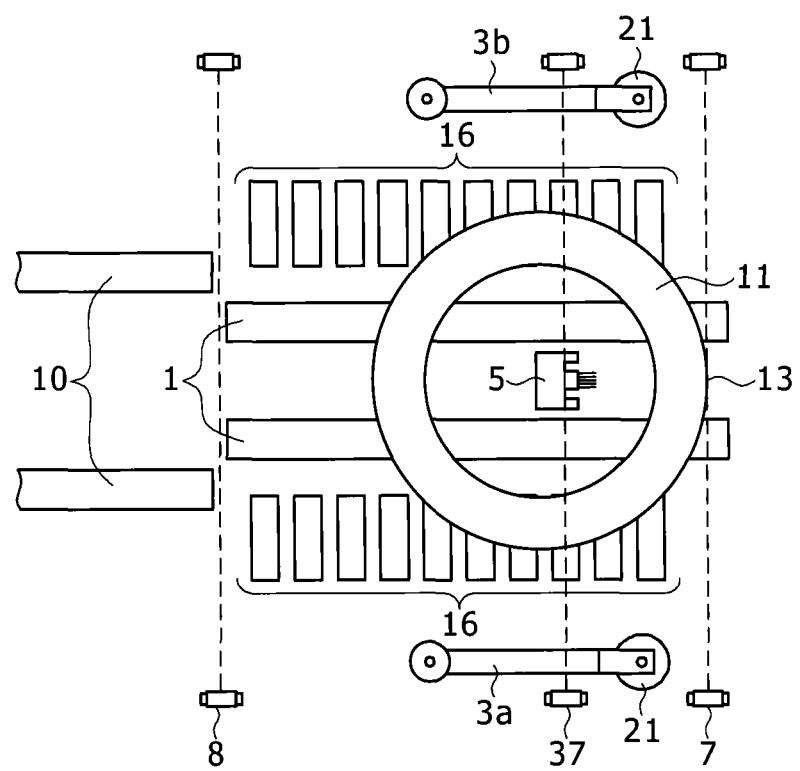
FIG. 7 is a top view illustrating a state where the tire is conveyed by the tire testing machine conveyor according to this embodiment.

When the tire 11 is directly conveyed on the entrance conveyor 9 in the conveying direction at the constant conveying speed V and the end (the front end of the tire outer diameter) 13 close to the test station 34 in the outer diameter of the tire 11 is detected by the downstream photoelectric sensor 7 as illustrated in FIG. 7, the rotation of the belt conveyor servo motor 2 is first stopped so as to stop the operation of conveying the tire 11 using the entrance conveyor 9 and the time T2(s) at which the front end 13 of the tire outer diameter is detected by the photoelectric sensor 7 is stored.

At this time, the conveying distance $\Delta L$ until the front end 13 is detected by the photoelectric sensor 7 after the rear end 12 of the tire 11 is detected by the photoelectric sensor 8 is calculated by the following equation (1) when the time at which the rear end 12 is detected by the photoelectric sensor 8 is denoted by T1, the time at which the front end 13 is detected by the photoelectric sensor 7 is denoted by T2, the distance between two photoelectric sensors 7 and 8 is denoted by L(mm), and the conveying speed of the entrance conveyor 9 is denoted by V(mm/s).

$$\Delta L = (T2-T1) \times V \qquad (1)$$

Then, the tire outer diameter D is calculated based on the following equation (2) by the use of the conveying distance $\Delta L$ obtained in the equation (1).

$$D = L - \Delta L \qquad (2)$$

For example, the conveying distance $\Delta L$ may be obtained by calculating the relation between the number of pulses of the encoder attached to the belt conveyor servo motor 2 and the movement distance of the entrance conveyor 9 for each pulse. Specifically, a method may be employed which counts the number of pulses from the time T1 of detecting the rear end of the tire 11 by the upstream photoelectric sensor 8 to the time T2 of detecting the front end thereof by the downstream photoelectric sensor 7 and multiplies the counted number of pulses by the movement distance for each pulse.

Furthermore, the conveying speed of the tire 11 using the entrance conveyor 9 may not be constant and may be changed gradually from the high speed to the low speed. For example, first, the tire 11 is conveyed at the comparatively high conveying speed V1 until the front end 13 of the tire reaches the position of the photoelectric sensor 37. Subsequently, the tire 11 is conveyed at the comparatively low conveying speed V2 when the front end 13 of the tire reaches the position of the photoelectric sensor 37. In this way, when the tire 11 is conveyed at the comparatively high speed at the first half time and is conveyed at the comparatively low speed at the second half time, the front end 13 of the tire may be positioned to the position of the photoelectric sensor 7 while the conveying time decreases. This effect becomes noticeable when the conveying distance of the tire 11 using the entrance conveyor 9 is large.

Further, when the conveying speed of the tire 11 using the entrance conveyor 9 is gradually changed from the high speed to the low speed, the tire outer diameter D may be calculated based on the conveying distance $\Delta L2$ until the front end 13 is detected by the photoelectric sensor 37 after the rear end 12 of the tire 11 is detected by the photoelectric sensor 8. Specifically, the conveying distance $\Delta L2$ is calculated based on the following equation (3) when the time at which the rear end 12 is detected by the photoelectric sensor 8 is denoted by T1, the time at which the front end 13 is detected by the photoelectric sensor 37 is denoted by T3, the distance between two photoelectric sensors 8 and 37 is denoted by L2(mm), and the conveying speed of the entrance conveyor 9 after the front end 13 of the tire reaches the position of the photoelectric sensor 37 is denoted by V2(mm/s).

$$\Delta L2 = (T3-T1) \times V2 \qquad (3)$$

Then, the tire outer diameter D is calculated based on the following equation (4) by the use of the conveying distance $\Delta L2$ obtained in the equation (3).

$$D = L2 - \Delta L2 \qquad (4)$$

Figure 8:
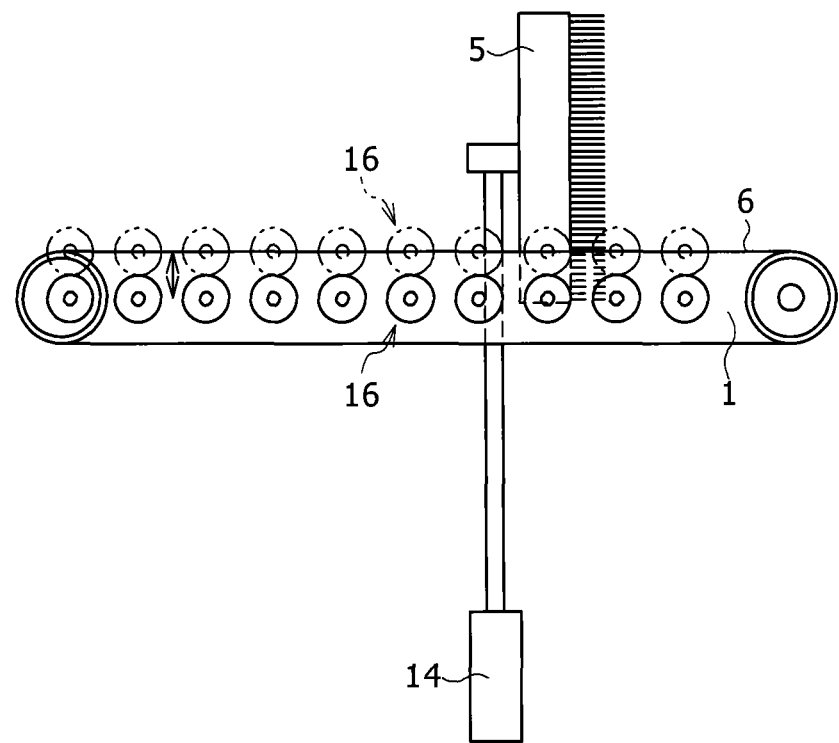
FIG. 8 is a side view illustrating an arrangement relation between the tire testing machine conveyor and the lubricator in the state of FIG. 7 in which the tire is conveyed by the tire testing machine conveyor according to this embodiment.

Here, in a state where the lubricator 5 is disposed at a position where the lubricator enters the inner diameter of the tire 11 until the pair of arm members 3a and 3b presses the tire 11 toward the upstream side and contacts the lubricator 5 after the operation of conveying the tire 11 is stopped by the detection of the front end 13 of the tire 11 using the downstream photoelectric sensor 7, the air cylinder 14 is operated so that the lubricator 5 ascends so as to protrude from the conveying surface 6 of the entrance conveyor 9 and the placement surface of the roller portion 16 as illustrated in FIG. 8. Furthermore, the tire 11 may be returned to the slightly upstream side by driving the entrance conveyor 9 before the arm members 3a and 3b are operated. In this way, the tire 11 may be further reliably pressed toward the lubricator 5 at the arm members 3a and 3b.

Further, as indicated by the dashed line of FIG. 8, the placement surface of the roller portion 16 is caused to ascend in relation to the conveying surface 6 of the entrance conveyor 9 so that the tire 11 is transferred from the entrance conveyor 9 to the roller portion 16 when the elevation mechanism (not illustrated) is driven. That is, the upper end (the unit roller of the upper end of each placement roller in a case where each placement roller is provided with the unit roller) of each placement roller of the roller portion 16 is caused to ascend so that the upper end of each placement roller is located above the conveying surface 6 of the entrance conveyor 9, and the tire 11 is transferred from the conveying surface 6 of the entrance conveyor 9 to the upper end of each placement roller of the roller portion 16 as the placement surface.

Subsequently, the air cylinder 4 is driven so that the pair of arm members 3a and 3b is rotated inward in the width direction so as to be closed, and the pair of arm members 3a and 3b presses the tire 11 placed on the roller portion 16 toward the upstream side by the pressing roller 21. Then, as illustrated in FIG. 9, the tire 11 approaches the lubricator 5 while being pressed by the pair of arm members 3a and 3b on the roller portion 16, so that the bead portion 15 (the inner periphery of the tire 11 illustrated in FIG. 10) of the tire contacts the lubricator 5.

Figure 9:
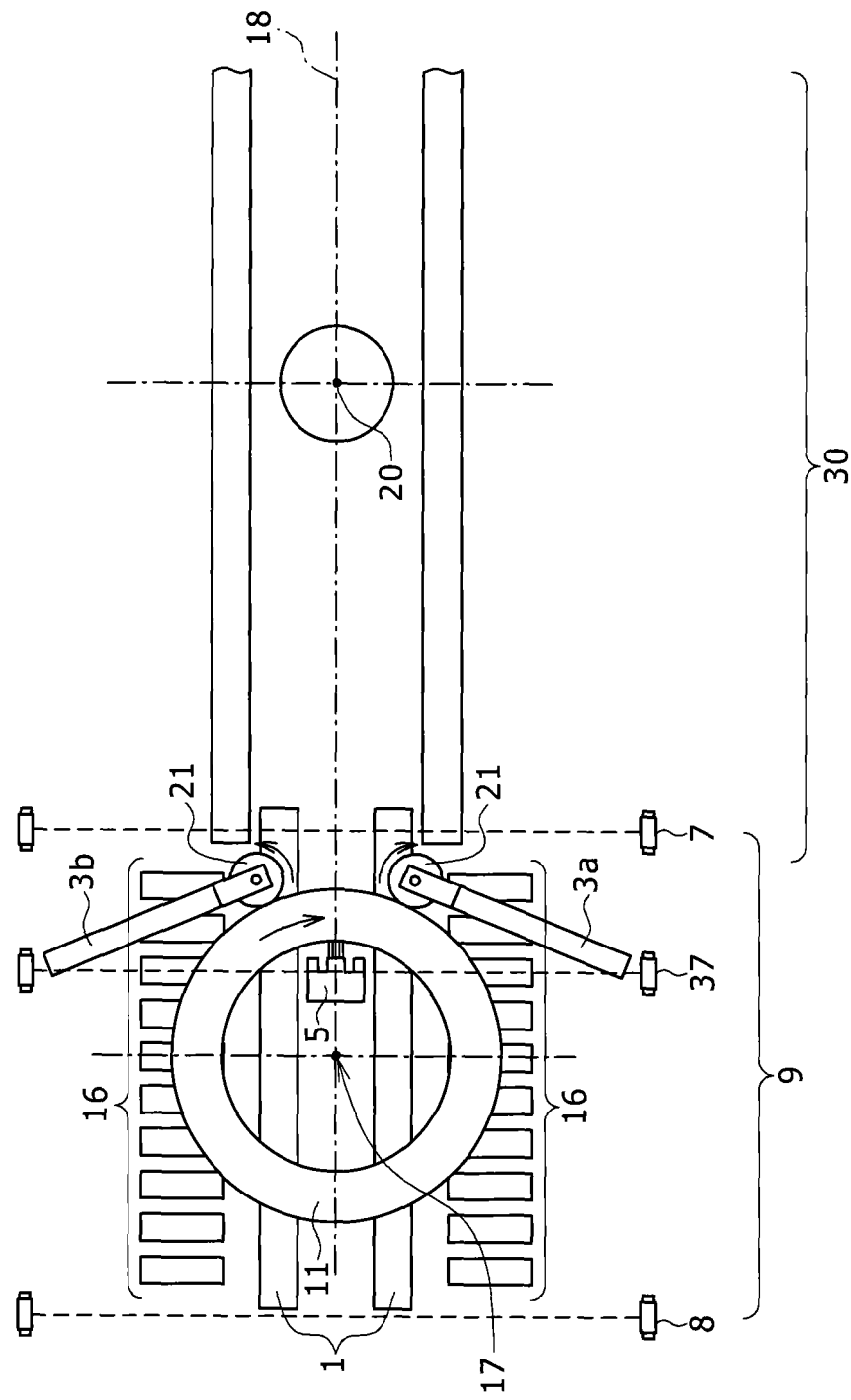
FIG. 9 is a top view illustrating a state where lubricant is applied from the lubricator to a bead portion of the tire on a roller portion in the tire testing machine conveyor according to this embodiment.
Figure 10:
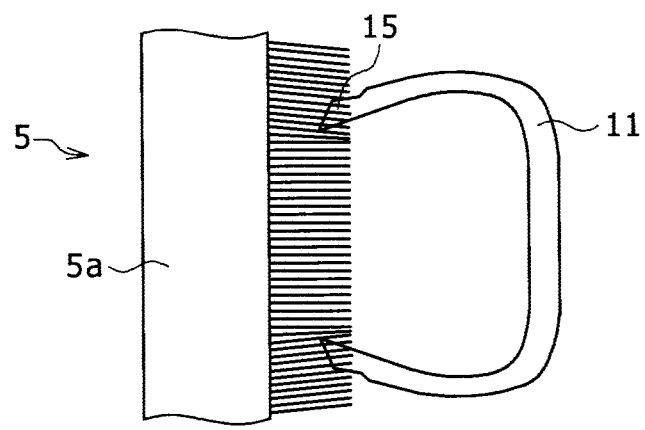
FIG. 10 is an enlarged cross-sectional view illustrating a brush of the lubricator of the tire testing machine conveyor according to this embodiment.

As illustrated in FIG. 9, one of the pressing rollers 21 attached to the front ends of the pair of arm members 3a and 3b is rotationally driven by the motor 22 in a state where the tire 11 is pressed from the outer periphery and the inner periphery of the tire by the lubricator 5 and the pressing rollers 21 of the pair of arm members 3a and 3b. Accordingly, the tire 11 on the roller portion 16 rotates within the horizontal plane, so that a brush 7b of the lubricator 5 applies lubricant to the bead portion 15 of the tire 11 as illustrated in FIG. 10.

Figure 11:
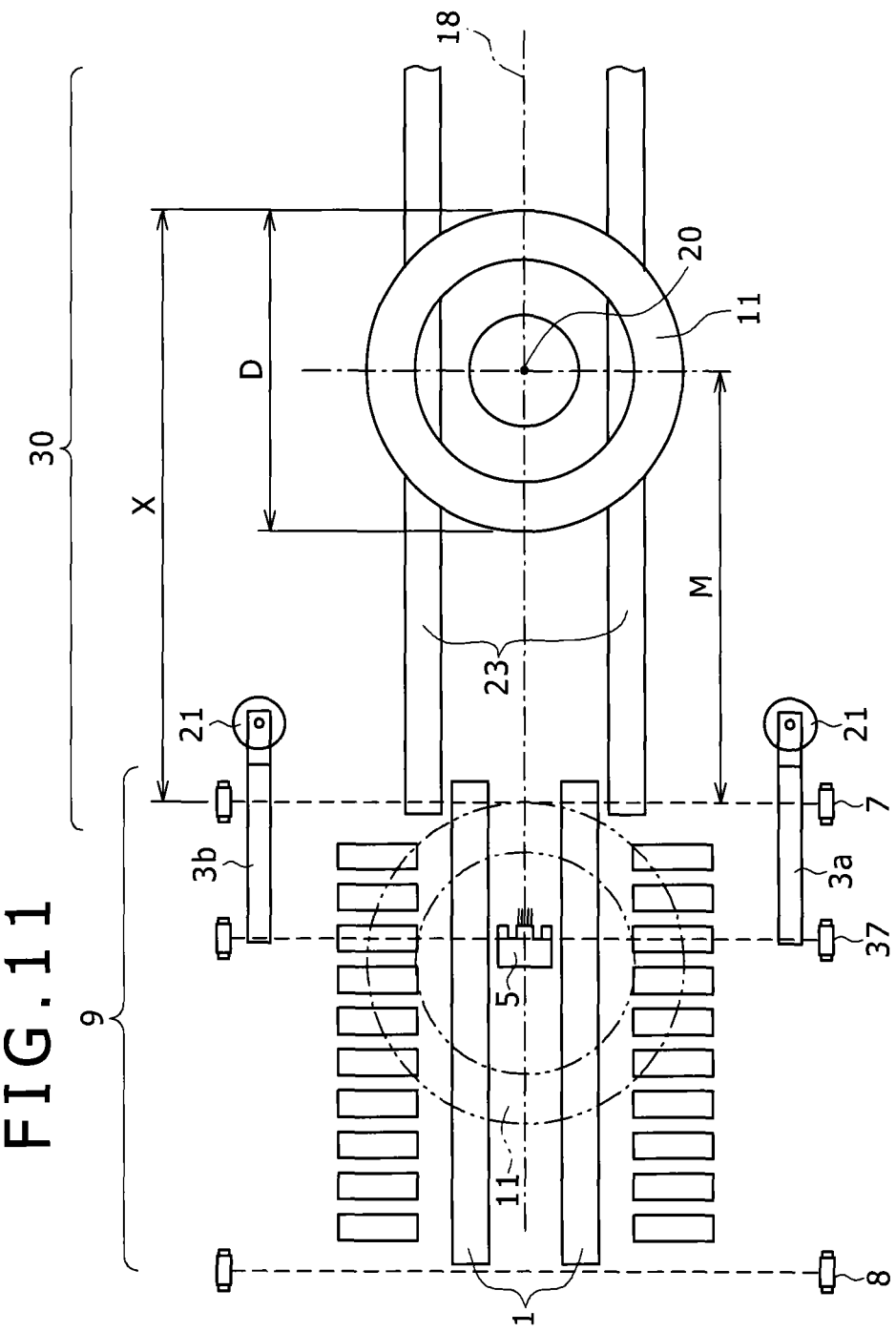
FIG. 11 is a top view illustrating a state where a tire that is positioned at the front end thereof is sent to a spindle in the tire testing machine conveyor according to this embodiment.

Subsequently, as illustrated in FIG. 11, the air cylinder 4 is driven so that the pair of arm members 3a and 3b is rotated outward in the width direction so as to be opened, and hence the operation of pressing the tire 11 by the pressing roller 21 is released. Subsequently, as indicated by the solid line of FIG. 8, when the elevation mechanism (not illustrated) is driven, the placement surface of the roller portion 16 is caused to descend in relation to the conveying surface 6 of the entrance conveyor 9, and hence the tire 11 is transferred again from the placement surface of the roller portion 16 onto the conveying surface 6 of the entrance conveyor 9.

Then, when the belt conveyor servo motor 2 is rotated so as to drive the entrance conveyor 9, the tire 11 is conveyed again to the downstream side provided with the test station 34. When the tire 11 is slightly moved toward the test station 34 by the entrance conveyor 9, the lubricator 5 that completely applies lubricant to the tire 11 is caused to descend by the air cylinder 14 so as to be returned to the standby position below the conveying surface 6 of the entrance conveyor 9 and the placement surface of the roller portion 16.

Then, as indicated by the dashed line of FIG. 11, the tire 11 is moved on the entrance conveyor 9 to a position where the front end 13 of the tire 11 is detected by the photoelectric sensor 7, and the tire 11 is positioned thereto. Accordingly, the front end 13 of the tire 11 that is positioned in the width direction of the entrance conveyor 9 is positioned to a predetermined position of the entrance conveyor 9 in the conveying direction, that is, a certain specific position (a position indicated by the dashed line of FIG. 11) regardless of the outer diameter dimension of the tire 11.

Then, as indicated by the solid line of FIG. 11, the entrance conveyor 9 and the center conveyor 30 are driven in a synchronized manner, and the tire 11 is conveyed until the tire rotation center (the tire shaft center 17) matches the spindle core 20 as the tire rotation center position of the lower spindle 24 of the test station 34.

Here, the conveying distance X of the tire 11 when the tire 11 of which the front end 13 is positioned in the entrance conveyor 9 is conveyed until the tire rotation center (the tire shaft center 17) of the tire 11 matches the spindle core 20 is calculated based on the following equation (5) from the distance M in the conveying direction from the predetermined position of the downstream photoelectric sensor 7 to the spindle core 20, that is, the distance M in the conveying direction from a predetermined position (a position indicated by the dashed line of FIG. 11) where the front end 13 of the tire 11 is positioned in the entrance conveyor 9 to the spindle core 20 and the outer diameter dimension D of the tire 11 obtained from the above-described equation (2) or (4).

$$X = M + D/2 \tag{5}$$

In this way, when the outer diameter dimension D of the tire 11 is given and the tire 11 is conveyed by the distance M from a predetermined position where the front end 13 of the tire 11 is positioned, the tire 11 is accurately positioned onto the spindle core 20 of the test station 34 on the center conveyor 30. For this reason, the tire 11 may be accurately positioned onto the spindle core 20 of the test station 34 without using the centering function of the centering arm or the sensor between the lower spindle 24 and the upper spindle 25 of the test station 34. Furthermore, in the above-described calculation equation, a difference between the actual stop position and the position based on the calculation is stored, and a correction term may be included therein for the correction. In this conveying operation, the entrance conveyor 9 and the center conveyor 30 are operated in a synchronized manner, so that the tire 11 is conveyed to the test station 34. In order to accurately convey the tire 11 by the conveying distance X through the synchronized operations of the entrance conveyor 9 and the center conveyor 30, the delivery of the tire 11 between the entrance conveyor 9 and the center conveyor 30 is important. Further, the entrance conveyor 9 is provided so that the downstream end thereof is located between the pair of conveyor belts 23 of the center conveyor 30, and the entrance conveyor 9 and the center conveyor 30 need to overlap each other.

When the operation of conveying the tire 11 using the center conveyor 30 is stopped after the tire 11 is conveyed by the distance M at a predetermined position where the front end 13 of the tire 11 is positioned by the synchronized operations of the entrance conveyor 9 and the center conveyor 30, the tire 11 is positioned onto the spindle core 20 of the test station 34, thereby completing the operation of conveying the tire 11 to the test station 34. Then, the tire 11 that is located on the center conveyor 30 and is conveyed onto the spindle core 20 of the test station 34 is placed on the rim of the lower spindle 24 in a manner such that the air cylinder 49 is driven so that the center conveyor 30 descends. Subsequently, when the ball screws 28a and 28b are driven so that the slide beam 26 descends, the tire 11 is chucked by the lower spindle 24 and the upper spindle 25 and air is injected into the tire 11. Then, the lower spindle 24 and the upper spindle 25 are rotated so as to rotate the tire 11, and a drum is caused to approach the tire 11 so as to apply a load to the tire 11, thereby testing the tire 11.

After the test of the tire 11 ends, the rotation of the lower spindle 24 and the upper spindle 25 is stopped, and the air of the tire 11 is extracted. Subsequently, the ball screws 28a and 28b are driven so that the slide beam 26 ascends and the upper spindle 25 ascends, and the air cylinder 49 is driven so that the center conveyor 30 ascends, thereby separating the tire 11 from the rim of the lower spindle 24. Then, as illustrated in FIG. 3, the pair of conveyor belts 38 as the drop conveyors of the exit conveyor 31 is caused to be parallel to the pair of conveyor belts 39, the center conveyor 30 is connected to the exit conveyor 31, and the tire 11 is conveyed to the exit conveyor 31 by the synchronized operations of the center conveyor 30 and the exit conveyor 31.

Furthermore, in a case where the next tire 11 exists in the entrance conveyor 9 in a standby state, the tire 11 subjected to the test by the test station 34 is conveyed to the exit conveyor 31, and the tire 11 existing in the entrance conveyor 9 in a standby state is conveyed to the test station 34 based on the conveying distance corresponding to the outer diameter as described above.

In this way, in the tire testing machine conveyor 32 of this embodiment, the belt conveyor servo motor 48 is driven so as to rotate the driving shaft 47, the pair of second left and right pulleys 46a and 46b connected to the driving shaft 47 is rotated so as to rotate the pair of first left and right pulleys 44a and 44b in which the pulley belts 45a and 45b are stretched to the pair of second left and right pulleys 46a and 46b, and the pair of first left and right pulleys 44a and 44b is rotated so as to rotate the pair of left and right belt driving pulleys 41a and 41b connected to the pair of first left and right pulleys 44a and 44b, and the conveyor belts 23 stretched to the belt driving pulleys 41a and 41b move, thereby stably driving the center conveyor 30. Then, since the belt conveyor servo motor 48 is provided at the outer lower side of the center conveyor 30 in the width direction, a space illustrated in FIGS. 4A to 4C is formed between the pair of belt driving pulleys 41a and 41b and a space formed between the pair of belt driving pulleys 42a and 42b of the center conveyor 30, the downstream end of the entrance conveyor 9 or the upstream end of the exit conveyor 31 may be located in the space formed between the pair of left and right belt driving pulleys 41a and 41b and the space between the pair of left and right belt driving pulleys 42a and 42b, and hence the center conveyor 30 and the entrance conveyor 9 or the exit conveyor 31 may be appropriately disposed without any gap or step therebetween and any interference between the driving units. Further, the downstream front end of the entrance conveyor 9 or the upstream front end of the exit conveyor 31 is located between the pair of conveyor belts 23 of the center conveyor 30 so that the plurality of conveyors is disposed in an overlapping state, and the entrance conveyor or the exit conveyor is driven so as to be synchronized with the center conveyor. Accordingly, since the tire 11 is smoothly delivered between the plurality of conveyors, the conveying distance during the delivery is correctly kept, and hence the tire 11 may be smoothly and fast conveyed.

While the preferred embodiment of the present invention has been described, the present invention is not limited to the above-described embodiment, and may be modified into various forms within the limit of claims.

In the tire testing machine conveyor 32 according to the above-described embodiment, the sensors that detect the front end 13 and the rear end 12 of the tire 11 on the entrance conveyor 9 are configured as the non-contact photoelectric sensors 7 and 8, the sensors may be configured as the other non-contact sensors or contact sensors.

As illustrated in FIGS. 1 and 3, the tire testing machine conveyor 32 according to the above-described embodiment includes the entrance conveyor 9, the center conveyor 30, and the exit conveyor 31, but the center conveyor 30 obtained by connecting the center conveyor 30 to the exit conveyor 31 in a continuous state may include only the center conveyor 30 and the entrance conveyor 9. Further, the center conveyor 30 is formed so that the entrance conveyor 9 is continuous to the center conveyor 30, and only the center conveyor 30 and the exit conveyor 31 may be provided. Further, the entrance conveyor 9 and the exit conveyor 31 may be configured as conveyors other than the belt conveyor.

In the tire testing machine conveyor 32 according to the above-described embodiment, the center conveyor 30 includes the air cylinder 49 and the LM guide 50, and hence the center conveyor 30 moves upward and downward. However, the present invention is not limited thereto, and the center conveyor 30 may be fixed. In such a case, the chucking mechanism 36 is formed so that both the upper spindle 25 and the lower spindle 24 are elevatable, and the chucking mechanism 36 may chuck the tire 11 on the center conveyor 30 in a manner such that the upper spindle 25 descends and the lower spindle 24 ascends.

In the tire testing machine conveyor 32 according to the above-described embodiment, the roller portion 16 is formed so that the placement roller 16a is provided with the unit roller having a rotation shaft perpendicular to the rotation shaft of the placement roller, but another free roller may be used as long as the tire is placed thereon in a rotatable state.

In the tire testing machine conveyor 32 according to the above-described embodiment, the elevation mechanism is supported while being attached to the pair of roller portions 16, but may be supported while being attached to the entrance conveyor 9. In such a case, the conveying surface of the entrance conveyor 9 moves upward and downward relative to the placement surface of the roller portion 16 by the elevation mechanism.

In the tire testing machine conveyor 32 according to the above-described embodiment, the lubricator 5 does not include the positioning roller, but the lubricator 5 may include a pair of positioning rollers that contacts the inner periphery of the tire 11 so as to position the tire 11. Further, a configuration is employed in which the outer peripheral surface of the tire 11 is pressed toward the center side by the pair of arm members 3a and 3b. However, a configuration may be employed in which a pair of second arm members each including a front end facing the upstream side and including a pressing roller is further provided in addition to the pair of arm members 3a and 3b and the outer peripheral surface of the tire 11 rotating in four directions is pressed toward the center side by the pair of arm members 3a and 3b and the pair of second arm members. In this case, in a case where the tire 11 on the entrance conveyor 9 in the state of FIG. 5 is interposed by the lubricator 5, the pair of arm members 3a and 3b, and the pair of second arm members, the belt conveyor servo motor 2 is rotated in a direction opposite to the conveying direction so that the tire 11 on the entrance conveyor 9 is conveyed at a constant low conveying speed in a direction opposite to the conveying direction. Then, when the tire 11 is returned to the position where the positioning roller of the ascending lubricator 5 contacts the inner periphery thereof, the pair of arm members 3a and 3b and the pair of second arm members are rotated inward in the width direction, and the outer periphery of the tire 11 is pressed toward the center side by the pressing rollers of the pair of arm members 3a and 3b and the pair of second arm members.

What is claimed is:

1. A tire testing machine conveyor that sends a tire to a center position of a spindle in a tire testing machine equipped with the spindle to which the tire to be tested is attached, the tire testing machine conveyor comprising:
   a center conveyor that includes a pair of loop-shaped conveyor belts; and
   at least one of an entrance conveyor that is provided at the upstream side of the center conveyor in the conveying direction so that the downstream end is located between the pair of loop-shaped conveyor belts, and an exit conveyor that is provided at the downstream side of the center conveyor in the conveying direction so that the upstream end is located between the pair of loop-shaped conveyor belts,
   wherein the center conveyor includes:
      a pair of sets of a belt driving pulley at the front side in the conveying direction and a belt driving pulley at the rear side in the conveying direction to stretch the loop-shaped conveyor belt therebetween;

a pair of connection shafts provided on any one rotation axis of the belt driving pulleys at the front side in the conveying direction and of the belt driving pulleys at the rear side in the conveying direction common to both the pair of sets of a belt driving pulley at the front side and a belt driving pulley at the rear side so as to protrude both outer sides of the center conveyor in the width direction of the conveyor belt;

a pair of first pulleys, each of the first pulleys being connected to each of the connection shafts;

a pair of second pulleys, each of the second pulleys being provided below each of the first pulleys so that a loop-shaped pulley belt is stretched between the first and second pulleys, each of the pair of second pulleys including a common rotation axis;

a driving shaft that is disposed on the rotation axis of the second pulleys and connects the pair of second pulleys to each other; and a driving unit that is connected to one end of the driving shaft.

2. The tire testing machine according to claim 1 conveyor, wherein the gap between the pair of loop-shaped conveyor belts is arbitrarily changeable, and wherein the width of the entrance conveyor and the width of the exit conveyor are formed so as to be smaller than a minimum value of the gap.

\* \* \* \* \*